US006805284B2

(12) United States Patent
Himmel et al.

(10) Patent No.: US 6,805,284 B2
(45) Date of Patent: Oct. 19, 2004

(54) METHOD FOR USE OF TRANSACTION MEDIA ENCODED WITH WRITE-AND-DESTROY ENTRIES

(75) Inventors: Maria Azua Himmel, Austin, TX (US); Herman Rodriquez, Austin, TX (US); Newton James Smith, Jr., Austin, TX (US)

(73) Assignee: International Business Machines Corporation, Armonk, NY (US)

(*) Notice: Subject to any disclaimer, the term of this patent is extended or adjusted under 35 U.S.C. 154(b) by 73 days.

(21) Appl. No.: 10/144,137

(22) Filed: May 10, 2002

(65) Prior Publication Data

US 2002/0162885 A1 Nov. 7, 2002

Related U.S. Application Data

(62) Division of application No. 09/213,919, filed on Dec. 17, 1998, now Pat. No. 6,386,446.

(51) Int. Cl.[7] .............................................. G06F 17/00
(52) U.S. Cl. ....................................................... 235/375
(58) Field of Search .................................. 235/375, 492

(56) References Cited

U.S. PATENT DOCUMENTS 3,702,464 A * 11/1972 Castrucci ................... 235/492
4,870,260 A * 9/1989 Niepolomski et al. ...... 235/381
6,016,955 A * 1/2000 De Rooij et al. ........... 235/379

* cited by examiner

Primary Examiner—Mark Tremblay
(74) Attorney, Agent, or Firm—Jeffrey S. LaBaw; Anne V. Dougherty

(57) ABSTRACT

A system and method for using write-and-destroy transaction cards which cannot be reprogrammed. The write-and-destroy transaction cards are programmed (i.e., written to) at bit increments representing, in total, the stated value of the card. The stated value may be represented in one or a plurality of denominations and currencies. In use, the remaining value of a card can be ascertained at a merchant location by reading those bits which have not been erased. The remaining value can additionally be confirmed by contacting the issuing financial institution using a unique serial number which may be encoded onto each transaction card. Upon confirmation that the card has sufficient value to conduct the desired transaction, the card is decremented by erasure of the bits representing that value. By invocation of locally stored software, or based upon communication with a host location, the current rate of currency exchange between the merchant-preferred currency and the currency represented at bit increments on the transaction card can be ascertained and the appropriate value decremented by erasure from the card. Once bits have been erased, they cannot be reprogrammed.

10 Claims, 3 Drawing Sheets

METHOD FOR USE OF TRANSACTION MEDIA ENCODED WITH WRITE-AND-DESTROY ENTRIES

This is a division of application Ser. No. 09/213,919, filed Dec. 17, 1998 now U.S. Pat. No. 6,386,446.

FIELD OF THE INVENTION

This invention relates to the field of electronic transactions, and more particularly relates to the use of transaction cards which have been encoded with single-use, write-and-destroy entries representing cash or other value.

BACKGROUND OF THE INVENTION

Transaction cards have become a preferred media for monetary, or other value, transactions due to ease of use, portability, and self-contained loss limits in the case of theft or accidental misplacement of one's card. Assigning the cards a fixed "face value," which is decremented with use, allows users to maintain budgets (particularly when used by children). Transaction cards have gained widespread acceptance for telephone usage, wherein the "currency" of the face value is minutes of long distance calling; for toll payment, such as the "E-Z Pass" program on New York State toll roads; for gas purchases, generally from a fixed group of merchants (e.g., Mobil gas stations), etc.

The types of transaction cards which are presently available include the category of magnetic cards (as shown at 10 in FIG. 1 with magnetic stripe 12), which have encoded information provided in a magnetic stripe, and so-called "smart cards" (20 of FIG. 2) which have on-board processors, 22, and memory locations, 23 and 24, to ensure integrity and reliability. While the magnetic versions are generally much less expensive to produce, their drawbacks include the fact that, in most instances, the magnetic medium can be reprogrammed to illegally add value to a "spent" card. Inadvertent exposure to electrical or magnetic fields can cause "reprogramming" and/or erasure of information from the magnetic stripe. In addition, the equipment used for programming and for reading of magnetic cards is not as reliable as would be desired.

Disadvantages of the smart card implementation include the expense of the memory and processor components, and the attendant processing, needed for creating each card. Smart cards have been developed with security measures to minimize the risk of counterfeiting cards or altering the programming thereof. Those security measures are, however, limited to the security algorithms which are built into the card and to the security measures which are part of the host card-programming application, and which also add further expense to the production and maintenance of smart cards.

At present, cash cards and smart cards have been limited in their usage to dedicated transactions. For example, a telephone calling card cannot be used to ride a subway, and vice versa. Each merchant or group of closely-related merchants requires the use of a specific card which is monitored (i.e., decremented) by a proprietary system. Therefore, while a user may find transaction cards to be conveniently portable, carrying a dozen such cards can become more burdensome (though still less risky) than carrying cash or a credit card.

Furthermore, transaction cards are generally not useful in foreign travel. While transaction cards may be preferable to carrying money and dealing with conversion to different currencies as one travels into different countries, widespread acceptance of transaction cards has been limited by some of the same shortcomings detailed above. Travelers' checks and credit cards are more likely used for international travel. If one uses a credit card, however, currency conversion will be done by the credit card issuer at the time of billing, which affords the card user little predictability at the time of purchase. Moreover, credit cards are not always accepted. Travelers' checks include a measure of loss limitation, in that each check has a limited value and can be traced using its unique serial number. The stated currency and denomination, which offers no alleviation of the currency exchange dilemma.

What has been proposed, and is the subject of co-pending patent application, Ser. No. 09/213,912, entitled "OPTICAL TRANSACTION CARD", which was filed on Dec. 17, 1998, now U.S. Pat. No. 6,669,084,and is assigned to the present assignee, is a transaction card having an optical stripe created using CD-ROM technology. The optical transaction card is initially programmed (i.e., written to) at all available locations on the optical stripe, so that there are no available bits which can be programmed by a counterfeiter. Each bit on the optical stripe can be read many times or erased once time only, and cannot be reprogrammed. Therefore, the so-called "write-and-destroy" Card is ideal for representing fixed amounts of money, or other measures of value. In addition, the optical programming technology is more reliable than that for magnetic stripe cards and is more affordable than that used to create smart cards. As additional advantage, the optical stripe is provided with such information as the issuing financial institution, a unique serial number, the total value of the card, and the relevant currencies and denominations represented by the programmed bits.

What is desirable is to provide a system and method for the ubiquitous use of write-and-destroy transaction cards.

Another objective is to provide for use of transaction card in a medium which is cost-effective, reliable, and secure.

What is desirable is to provide a system and method for the ubiquitous use of write-and-destroy transaction cards.

Another objective is to provide for use of a transaction card in a medium which is cost-effective, reliable, and secure.

Still another objective is to provide for use of a transaction card for a variety of non-related transactions.

Yet another objective is to provide for use of a transaction card which can be decremented in various currencies at present-moment rates of exchange during international travel.

Another objective is to provide security and loss limitation by tracking cards through the listed financial institution at time of use.

SUMMARY OF THE INVENTION

These and other objectives are realized by the present invention which provides a system and method for using write-and-destroy transaction cards which cannot be reprogrammed. The write-and-destroy transaction cards are programmed (i.e., written to) at bit increments representing, in total, the stated value of the card. The stated value may be represented in one or a plurality of denominations and currencies. In use, the remaining value of a card can be ascertained at a merchant location by reading those bits which have not been erased. The remaining value can additionally be confirmed by contacting the issuing financial institution using a unique serial number which may be encoded onto each transaction card. Upon confirmation that the card has sufficient value to conduct the desired transaction, the card is decremented by erasure of the bits representing that value. By invocation of locally stored software, or based upon communication with a host location, the current rate of currency exchange between the merchant-preferred currency and the currency represented at bit increments on the transaction card can be ascertained and the appropriate value decremented by erasure from the card. Once bits have been erased, they cannot be reprogrammed.

BRIEF DESCRIPTION OF THE DRAWINGS

The invention will now be described in greater detail with specific reference to the appended drawings wherein.

DESCRIPTION OF THE PREFERRED EMBODIMENT

Figure 1A:
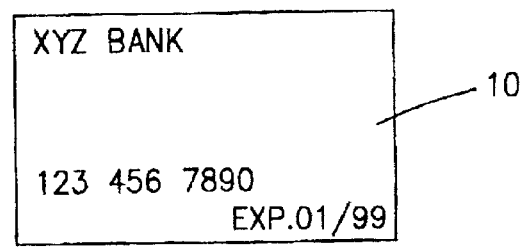
FIGS. 1A and 1B provide illustrations of a write-and-destroy transaction card created using optical technology.
Figure 1B:
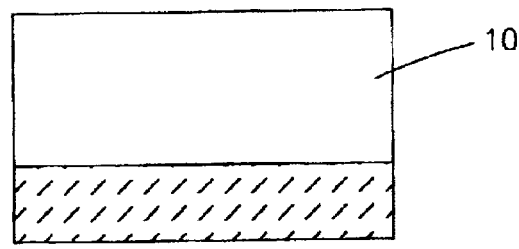

In accordance with the present invention, a write-and-destroy transaction card, such as the optical transaction card depicted as 10 in FIGS. 1A and 1B, is programmed at every available bit location, thereby leaving no room for unauthorized programming. Furthermore, a card created using write-and-destroy technology can only be read or destroyed/erased/overwritten thereby preventing reprogramming. The face of the card, as shown in FIG. 1A, may have the same human-readable information that prior art transaction cards bear, including the name of the financial institution, the name of the party to whom the card has been issued, a unique card number, and an expiration date. For security reasons, less than all of the listed information may be included in the human-readable format on the card. That which is provided in human-readable format is not used by the present invention; but, may be duplicated as machine-readable encoded information provided on the card for the inventive usage. On either the front or the back of the card, as depicted in FIG. 1B, machine-readable information will be provided, for example in the horizontally (as shown) or vertically (not shown) disposed optical stripe. The optical stripe is preferably located along an edge of the card, for ease of presentation to an optical reader; but, may in fact be incorporated anywhere on either or both faces of the card.

The information which is programmed onto the write-and-destroy medium includes a header segment for encoding certain preferred header information, and a "body" segment comprising one or more linked lists, one for each denomination value, followed by a linked list, comprising denomination entries entry(a) through entry(x) for that denomination value. The one or more linked lists encode the incremental entries cumulatively representing the face value of the card. The card may have a series of denomination value/linked list pairs representing, for example, hundreds, tens, ones, and hundredths (i.e., pennies) in U.S. dollars.

All fields and entries are encrypted and are preferably written on the write-and-destroy medium in two different locations for protection. The integrity of a write-and-destroy card depends upon the fact that every entry has been written to, even if the entry does not represent part of the header or an increment of the card value. By writing to all locations, the programming equipment leaves no unwritten space for a counterfeiter to use in entering amounts not authorized by the financial institution. Writing all information twice, the familiar redundancy used in many CD-ROM and related applications, provides integrity from the standpoint of reliability of the programming/writing equipment.

The header segment includes fields for the following: the identity of the issuing agency/financial institution; locale information including the country (or countries) and currency (or currencies) which the incremental "body" entries represent; the date of recording or programming of the card; a unique sequence or serial number, which may be the same or different from that optional card number printed in human-readable format on the card face; and, the total amount which the programmed bits represent. The unique serial number, or sequence number, can be used for tracing cards and for invalidation of a card by the issuing financial institution in the event that a write-and-destroy card is reported lost or stolen, as further detailed below.

In the "body", the fields include at least one denomination value entry followed by a linked list of denomination entries comprising entry(a) through entry(x). Each denomination entry is accompanied by a link to the next entry. All denomination entries, entry(a) through entry(x-1), encode some increment of the card value, with the exception of the final entry, entry(x). Entry(x), the last entry, is written as NULL to indicate that there are no further links and that the value of the card in that particular denomination is complete. Multiple linked lists may be provided, as noted above, for different denominations and/or different currencies.

In use, the write-and-destroy transaction card may be presented by a user for reading (e.g., to check an available balance) or as value rendering for a transaction. Two types of remote location write-and-destroy transaction card systems can be implemented. A first, reader location, is simply equipped with components for reading the remaining value of the transaction card. A second, transaction location generally found at a "point-of-sale", has not only the reader capabilities but also erasing capabilities for destroying card denomination entries pursuant to a transaction. Representative write-and-destroy transaction location equipment is shown in FIG. 2.

Figure 2:
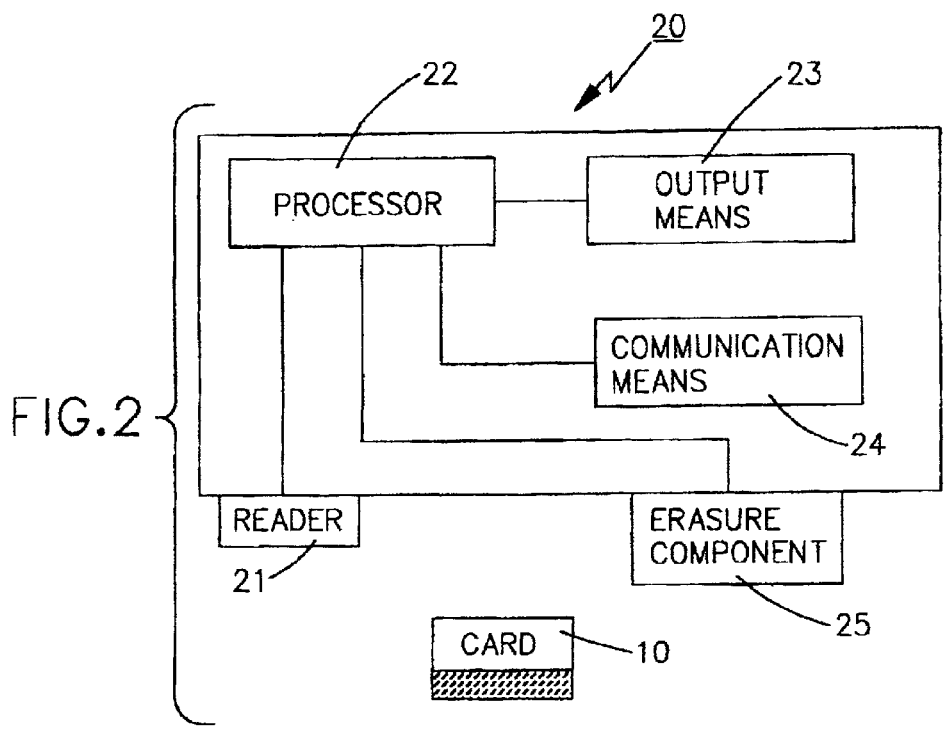
FIG. 2 provides a schematic illustration of a write-and-destroy card reader in accordance with the present invention.

As shown in FIG. 2, the representative write-and-destroy transaction location equipment, 20, includes the following: card scanner, 21; processor location, 22; display or other output (e.g., printer) means, 23; a communication component, 24; and an erasure component, 25. The scanner/reader 21 comprises optical or other relevant scanning means for locating and reading the information encoded on the card. Processor component 22 is adapted to interpret and use the scanned information. For example, the processor component may include a comparator component for comparing read amounts to merchant-input or scanned transaction amounts. The processor may additionally be adapted to access locally stored software for currency conversion as further detailed below. Output means 23 may be a display, printer, voice chip or other output means for delivering balance information or other interactive exchange information. Communication means 24 is provided for establishing contact with the issuing financial institution, clearing house, or other remote host location as appropriate. Finally, the erasure component, found at transaction locations but not reader locations is equipped with an optical writing head for overwriting, and thereby destroying, denomination entries, or any alternative erasure means for otherwise "erasing" bits in such a way as to decrement the card and prevent reprogramming of same.

If the user simply wishes to check an available balance, the user may scan the card at a remote reader location (e.g., kiosk, home computer scanner, point-of-sale location, etc.) which may be equipped only with a reader/scanner and output means. The reader could ascertain the remaining value simply by reading the denomination value location(s) and determining what linked denomination entry bits have not yet been erased. As an alternative method for checking the available balance, if appropriately equipped, the reader could contact the issuing financial institution, using the identification information in the card header, provide the serial number of the card, and ask the issuing financial institution for the available balance. Additional security and tracking can be provided by the inventive system, given the fact that each card's serial number can be communicated to the issuing financial institution, clearing house or other relevant host location. Specifically, if a transaction card has been reported lost or stolen, any inquiry regarding that card, whether for balance inquiry or transaction, will be rejected, alerting a merchant to the fact that the card bearing that serial number has been invalidated.

Figure 3:
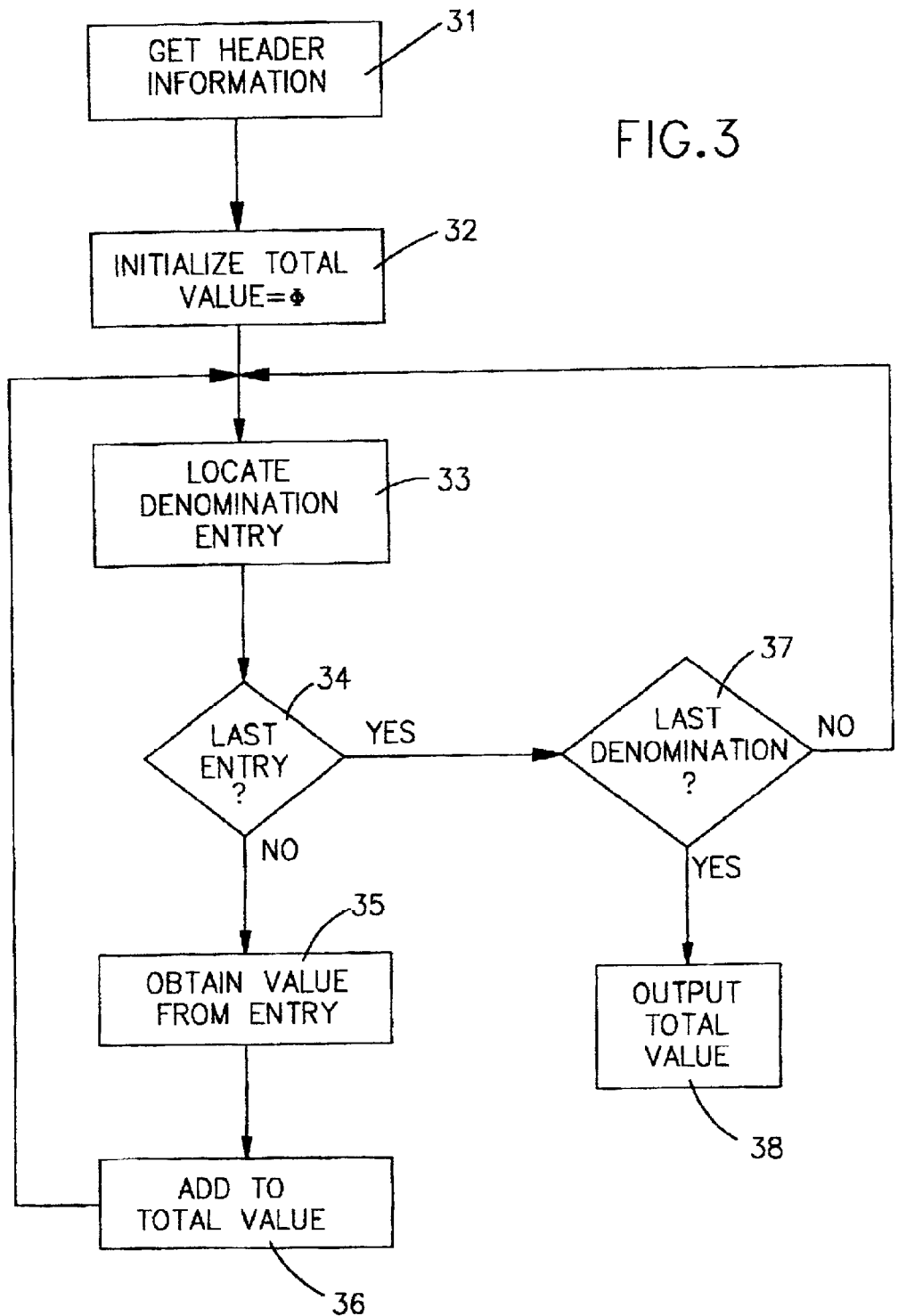
FIG. 3 depicts a representative process flow for querying the remaining balance on a transaction card.

FIG. 3 illustrates a sample process flow for conducting a transaction card balance inquiry. At step 31, the reader obtains the header information and, at step 32, initializes a counter component with a total card value of zero. At step 33, the system locates a denomination entry. If, as determined at step 34, the located denomination entry is not the last entry in the linked list for that denomination, the value is obtained from that entry, at step 35, and added to the total value at step 36. After incrementing the total value, the system locates the next denomination entry in that linked list and adds same until a determination is made at step 34 that the located entry is the last entry in the linked list for that denomination (such that no value is represented by that denomination entry). If the last entry has been located for a given denomination, the system determines, at step 37, if other denominations are represented by linked lists on the card. If other denominations are represented, the process is repeated until the value of all available entries has been added to the total value. Once a determination is made as step 37 that no further denominations are represented on the card, the system outputs the total value, at step 38. As noted above, the output may be in the form of printing, displaying, etc.

Alternatively, for transaction card balance inquiries, the remote reader site can initiate communication with a remote location and obtain the balance from that site. Remote site balance inquiries rely on real-time redemption of all debited values by merchant sites. It is also to be noted that the balance amount must be in appropriate denominations for certain transactions. For example, one may have an available balance of $120.00 in increments of one hundred and two tens, yet be unable to use the card to purchase a $70.00 item unless the merchant is willing to decrement the greater amount and give the card user the balance in cash, or unless the contacted financial institution will remit the balance to the card user's account.

Should a transaction be desired, the merchant transaction location equipment will, in addition to ascertaining the remaining card balance, compare the remaining card balance with the amount of the desired transaction or request that the comparison be made by the remote location. If the remaining card balance is sufficient, the transaction location will decrement the card in the amount of the transaction by destroying those bits which represent the transaction amount. The merchant can redeem the transaction amount at the time of consummation of the transaction, or collect all of the day's transaction amounts for redemption by uploading to the financial institution at the end of the day or at any later time.

Figure 4:
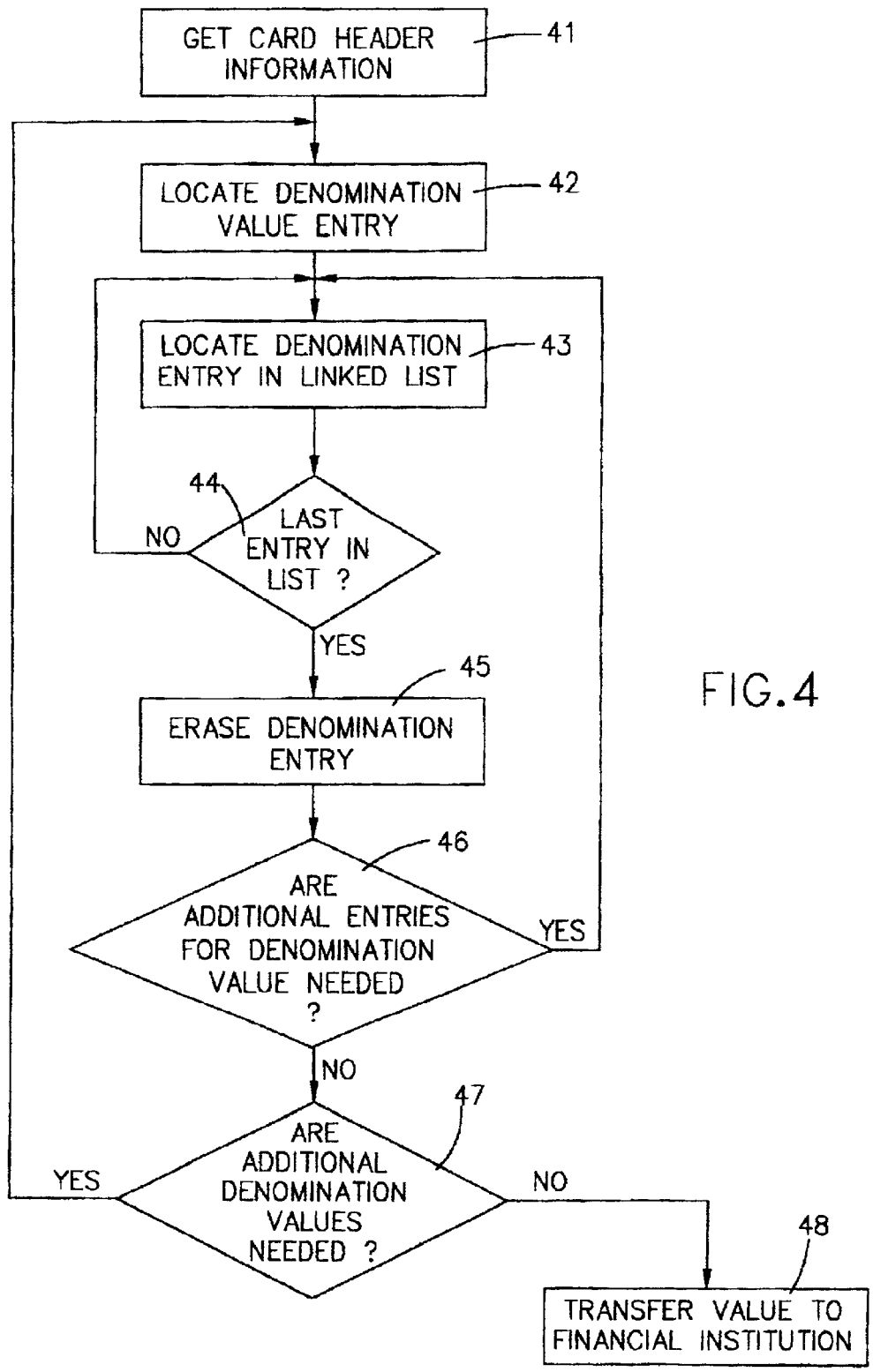
FIG. 4 depicts a representative process flow conducted at a merchant-site write-and-destroy card transaction processing location in accordance with the present invention.

FIG. 4 provides one representative process flow of the steps conducted by a merchant-site transaction location for a transaction involving a write-and-destroy transaction card. For ease of description, a running example will be introduced in which a user wishes to make a purchase in U.S. dollars in the amount of $120.00. At step 41, the reader/scanner component will obtain the card header information, including the information about the financial institution, the serial number of the card, the expiration date of the card (if any), the total value of the card, the currency or currencies represented by denomination entries on the card, and the denomination values (e.g., dollars, cents) represented by linked lists of denomination entries on the card. At this point in the transaction, the merchant may wish to communicate with the financial institution, or alternative location designated in the card header, for purposes of verifying the validity of the card and confirming the balance. Depending upon the amount and relevant currency of the transaction, the transaction location system will next, at step 42, locate the relevant denomination value entry and then, at 43, locate the linked list of denomination entries for that value. In the running example, the system will minimally need to locate the linked lists for hundreds of U.S. dollars and tens of U.S. dollars. The system will locate the first denomination entry for the given denomination and determine, at step 44, if that entry is the last entry in the linked list. If not, the system will proceed to the next successive entry for that denomination until the last entry is located. In the running example, the system locates the last valid $100.00 entry in the linked list and erases that entry at step 45. Assuming redundancy in programming of the card, one or both of the redundant locations will be erased at a merchant location during the transaction. The system next determines if any additional denomination entries in that linked list are needed at step 46. In the running example, the answer is "no" since no further hundreds of dollars are required.

Next, the system determines if any other denomination linked lists must be located and decremented in order to satisfy the transaction. The determination, at step 47, for the running example is "yes". Therefore, the system located the denomination value for tens of U.S. dollars at step 42, finds the last tens denomination entry at steps 43 and 44 and erases same at step 45. Since an additional $10.00 must be decremented, as determined at step 46, the loop of steps 42–45 is repeated. After erasure of the one entry for one hundred dollars and the two entries for ten dollars, the determination at step 47 is that no further denominations are required to satisfy the transaction. Therefore, at step 48, the system may contact the financial institution, clearing house, or other appropriate remote location to redeem the transaction value (e.g., $120.00). Alternatively, the system may locally increment a counter for that financial institution for later uploading of a day's worth of redemptions.

If a transaction card includes linked lists of denomination entries for different currencies, international transactions are relatively straight-forward. If, however, the card includes one currency and the transaction site requires a different currency, or if the user wishes to obtain local currency when travelling, currency conversion will be necessary. A first method for dealing with transactions requiring currency rate conversions is for the system to access locally stored rate information (e.g., which may be updated regularly) and determine the relevant amount of the card's denomination entries which will be necessary to consummate the transaction. Such conversion would be conducted after step 41 and before step 42 in FIG. 4.

An alternative conversion approach is to contact a remote site with the transaction information, between steps 41 and 42, to obtain the appropriate amount to be decremented from the card. The "official" conversion rate should, ideally, be displayed to the card user, and an additional step of user approval (e.g., by entry of a password) should be required for conversion transactions. In addition, merchants may wish to modify the conversion rate, to assess a surcharge for their conversion services. If such is the case, again, user approval of the transaction amount is preferably sought.

The invention has been described with reference to several specific embodiments. One having skill in the relevant art will recognize that modifications may be made without departing from the spirit and scope of the invention as set forth in the appended claims.

What is claimed is:

1. A method for conducting an electronic transaction for a transaction amount based upon presentation of a transaction card having a first plurality of bit location comprising identifier bit locations and a second plurality of bit locations comprising a plurality of value bit locations encoded thereon, said plurality of value bit locations comprising a plurality of linked lists of entries, one linked list for each denomination represented on said card, and one value bit entry for each increment of said denomination, said method comprising the steps of:

(a) reading said first identifier bit locations;
    (b) ascertaining if the transaction value represented by said plurality of second value bit locations is sufficient to pay the transaction amount for said electronic transaction by determining the transaction value of the card by reading the value bits which have not been erased and comparing the transaction value to the transaction amount; and
    (c) decrementing said card in the transaction amount for said electronic transaction by obliterating at least one of said plurality of second value bit locations when said transaction value is at least equal to the transaction amount.

2. The method of claim 1 wherein said decrementing said card in the amount of said electronic transaction comprises the steps of:

locating a first one of said plurality of second value bit locations for a denomination;
    determining it said located one of said second value bit locations is the last entry for said denomination; and
    erasing said located one of said second value bit locations if it is the last entry for said denomination.

3. The method of claim 2 further comprising repeating said locating, determining and erasing for a plurality of denominations until said card has been decremented in the amount of said electronic transaction.

4. The method of claim 1 wherein said second value bit locations on said transaction card encode an encoded currency which is different from that transaction currency needed for said electronic transaction, further comprising the steps of:

determining the rate of exchange between the encoded currency and the transaction currency; and
    ascertaining the number of second value bit locations to be obliterated based on said rate of exchange.

5. A program storage device readable by machine, tangibly embodying a program of instructions executable by the machine to perform method steps for conducting an electronic transaction based upon presentation of a transaction card having a first plurality of bit location comprising identifier bit locations and a second plurality of bit locations comprising a plurality of value bit locations encoded thereon, said plurality of value bit locations comprising a plurality of linked lists of entries, one linked list for each denomination represented on said card, and one value bit entry for each increment of said denomination, said method comprising the steps of:

(a) reading said first identifier bit locations;
    (b) ascertaining if the transaction value represented by said plurality of second value bit locations is sufficient to pay the transaction amount for said electronic transaction by determining the transaction value of the card by reading the value bits which have not been erased and comparing the transaction value to the transaction amount; and
    (c) decrementing said card in the transaction amount for said electronic transaction by obliterating at least one of said plurality of second value bit locations when said transaction value is at least equal to the transaction amount.

6. The program storage device of claim 5 wherein said second value bit locations on said transaction card encode an encoded currency which is different from that transaction currency needed for said electronic transaction, and wherein said method steps further comprise:

determining the rate of exchange between the encoded currency and the transaction currency; and
    ascertaining the number of second value bit locations to be obliterated based on said rate of exchange.

7. The program storage device of claim 5 wherein said determining the transaction value further comprises the steps of:

(b1) initializing a transaction value counter;
    (b2) locating a first value bit location for a first denomination;
    (b3) determining if said located value bit location is the last entry for said denomination;
    (b4) reading the denomination value from said located value bit location when said located value bit location is not the last entry;
    (b5) adding said read denomination value to said transaction value counter;
    (b6) locating a next successive value bit location for said first denomination unless the determination in step (b3) indicates that the last entry has been located;
    (b7) repeating steps (b3) through (b6) until it is determined that said location is said last entry for said denomination.

8. The program storage device of claim 7 wherein said transaction card includes more than one value denomination, and wherein said determining the transaction value further comprises the steps of:

(b8) locating the first value bit location for a next successive denomination;
    (b9) determining if said located value bit location is the last entry for said successive denomination;
    (b10) reading the denomination value from said located value bit location;
    (b11) adding said read denomination value to said transaction value counter;
    (b12) locating a next successive value bit location for said successive denomination;
    (b13) repeating steps (b9) through (b12) until it is determined that said location is said last entry for said denomination; and (b14) repeating steps (b8) through (b13) for all denominations on said card.

9. The method of claim 1 wherein said determining the transaction value further comprises the steps of:
 (b1) initializing a transaction value counter:
 (b2) locating a first value bit location for a first denomination;
 (b3) determining if said located value bit location is the last entry for said denomination;
 (b4) reading the denomination value from said located value bit location when said located value bit location is not the last entry;
 (b5) adding said read denomination value to said transaction value counter;
 (b6) locating a next successive value bit location for said first denomination unless the determination in step
 (b3) indicates that the last entry has been located;
 (b7) repeating steps (b3) through (b6) until it is determined that said location is said last entry for said denomination.

10. The method of claim 9, wherein said transaction card includes more than one value denomination, and wherein said determining the transaction value further comprises the steps of:
 (b8) locating the first value bit location for a next successive denomination;
 (b9) determining if said located value bit location is the last entry for said successive denomination;
 (b10) reading the denomination value from said located value bit location;
 (b11) adding said read denomination value to said transaction value counter;
 (b12) locating a next successive value bit location for said successive denomination;
 (b13) repeating steps (b9) through (b12) until it is determined that said location is said last entry for said denomination; and
 (b14) repeating steps (b8) through (b13) for all denominations on said card.

* * * * *